US006619309B2

United States Patent
Monks

(10) Patent No.: US 6,619,309 B2
(45) Date of Patent: Sep. 16, 2003

(54) EXHAUST CART EXCESS FLOW VALVE WITH LINEAR ACTUATOR

(75) Inventor: Christopher Monks, Greensburg, PA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 251 days.

(21) Appl. No.: 09/878,892

(22) Filed: Jun. 11, 2001

(65) Prior Publication Data

US 2002/0185179 A1 Dec. 12, 2002

(51) Int. Cl.$^7$ ................................................. G05D 7/00
(52) U.S. Cl. ........................ 137/14; 137/495; 137/498
(58) Field of Search ............................... 137/494, 495, 137/497, 498, 14, 460, 461

(56) References Cited

U.S. PATENT DOCUMENTS 4,188,971 A * 2/1980 Otteson .................. 137/498 X
5,137,054 A * 8/1992 Harper ................... 137/498 X
6,131,606 A * 10/2000 O'Neill ..................... 137/495
6,308,730 B1 * 10/2001 Schulze ..................... 137/495

* cited by examiner

Primary Examiner—Kevin Lee
(74) Attorney, Agent, or Firm—Mayer, Fortkort & Williams, PC; Stuart H. Mayer, Esq.

(57) ABSTRACT

An excess flow valve includes a linear actuator that effectively isolates a defective CRT from others under preparation when the defective CRT causes the vacuum drawn on the exhaust cart to be compromised. During the manufacture of CRT's a manufacturing step requires that a vacuum be drawn on all CRT's while baking in an exhaust oven. This process is usually performed simultaneously on a plurality of CRT's connected to an exhaust cart by a manifold such that if a defect were to occur to one CRT that breaks breaking the vacuum, all the other CRT's under preparation would be compromised. This excess flow valve with the linear acutator and a method of operating it prevents excess damage to otherwise non-damaged CRTs.

25 Claims, 3 Drawing Sheets

EXHAUST CART EXCESS FLOW VALVE WITH LINEAR ACTUATOR

FIELD OF THE INVENTION

The present invention relates generally to methods and apparatuses for manufacturing Cathode Ray Tubes (CRTs), and more particularly to methods and apparatuses for manufacturing CRTs in which a vacuum is maintained on multiple CRT's during the manufacturing process.

BACKGROUND OF THE INVENTION

During the manufacture of CRT's, such as small profile 7 inch CRT's for example, part of the manufacturing process includes drawing a vacuum on every CRT, while baking the CRT's in an exhaust oven. This is typically performed utilizing exhaust carts, which permit drawing a vacuum on four CRT's simultaneously. Each exhaust cart comprises a manifold with ports connected to each CRT. A vacuum is drawn on the entire manifold and thereby on the 4 CRT's under preparation.

A drawback of this approach, however, is that in the event that one CRT breaks, the vacuum is destroyed for all the CRT's under manufacture, thereby rendering all the CRT's being prepared ultimately defective since baking then occurs in the absence of a vacuum.

The present invention is therefore directed to the problem for developing a method and apparatus for isolating a damaged or broken CRT connected to an exhaust cart during the vacuum extraction process, thereby preserving the vacuum in the unbroken CRT's under fabrication and thus preventing collateral damage to otherwise undamaged units connected to the exhaust cart during the baking process.

SUMMARY OF THE INVENTION

The present invention solves this problem by providing a valve assembly installed in an exhaust cart manifold port that effectively seals off the manifold port connected to a CRT in which a vacuum is compromised due to structural failure. By sealing off the port connected to the defective CRT under preparation, the vacuum to the other CRT's under preparation is not be compromised and production defects to these CRT's as a result of a single defective CRT can be avoided.

According to one aspect of the present invention, a device for controlling the flow through a vacuum extraction manifold port includes a hollow pipe having a first portion and a second portion and a cavity that includes a retaining surface disposed within it. The pipe also includes exit ports and a poppet having a front section and a rear section mounted so as to be able to slide within the pipe cavity. The front section of the poppet is attached to the first portion of the pipe by a biasing means. The device also includes an actuator rod disposed within the cavity. The actuator rod has a first end attached to the rear section of said poppet, and a second end connected to actuating means disposed at the second portion of the pipe.

During introduction of a gaseous flow into the first portion of the pipe at less than a first pressure value, the poppet remains in an intermediate position in the pipe cavity thereby permitting the gaseous flow to travel through the first portion of the pipe, past the poppet and through the exit ports, thereby exiting the pipe.

During introduction of the gaseous flow into the first portion of the pipe at greater than a second pressure value, however, the pressure of the gaseous flow causes the poppet to slide against the retaining surface thereby establishing a seal confining the gaseous flow within said cavity and eliminating further flow through the pipe.

During introduction of the gaseous flow at greater than a third pressure value, the actuating means causes the actuator rod to drive the poppet against the retaining ring thereby establishing the seal and confining said gaseous flow within the pipe cavity and eliminating further flow through the pipe.

According to another aspect of the present invention, in the above device the pipe is fabricated of steel.

According to another aspect of the present invention, in the above device, the exit ports are perforations in the pipe.

According to yet another aspect of the present invention, in the above device, the biasing means includes at least one spring.

According to another aspect of the present invention, in the above device, the actuating means includes a linear actuator.

According to another aspect of the present invention, in the above device, the linear actuator includes pressure-sensing means.

According to another aspect of the present invention, in the above device, the gaseous flow includes air contained in a CRT connected to the pipe.

According to another aspect of the invention, in the above device, the pipe has an annular shape.

According to another aspect of the present invention, in the above device, the intermediate position occupied by the poppet is a position between the biasing means and the retaining surface.

According to another aspect of the invention, in the above device, the gaseous flow is generated by a vacuum pump extracting a gas from a vessel attached to said first portion of said pipe.

According to another aspect of the invention, a device for controlling gaseous flow in a vacuum extraction manifold port includes a hollow pipe having a first portion and a second portion. The pipe includes a cavity with a retaining surface. The pipe also includes a poppet mounted within the pipe cavity such that it is able to slide within the cavity. The poppet has a front section and a rear section and is connected to the first portion of the pipe by a first biasing means attached to the front section of the poppet. The poppet is also connected to the second portion of the pipe by a second biasing means attached to the rear section of the poppet. Also contained in the pipe are exit vents to permit the escape of a gaseous flow through the pipe.

During introduction of the gaseous flow into the first portion of the pipe at less than a first pressure value, the poppet remains in an intermediate position within the cavity thereby permitting the gaseous flow to travel through the first portion of the pipe, past the poppet and exit the pipe through the exit ports.

During introduction of the gaseous flow into the first portion of the pipe at greater than a second pressure value, the pressure of the gaseous flow causes the poppet to slide against the retaining surface thereby establishing a seal confining the gaseous flow within the cavity and preventing further gaseous flow to exit the pipe.

During introduction of the gaseous flow at greater than a third pressure value the second biasing means forces the poppet against the retaining surface thereby establishing the seal confining the gaseous flow within the cavity and preventing further flow through the pipe.

According to another aspect of the present invention, in the above device, the pipe is fabricated of steel.

According to another aspect of the present invention, in the above device, the exit ports include perforations in the pipe.

According to another aspect of the present invention, in the above device, the first biasing means includes at least one spring.

According to yet another aspect of the present invention, in the above device, the second biasing means includes a linear actuator and actuating rod.

According to another aspect of the present invention, in the above device, the linear actuator includes pressure-sensing means.

According to another aspect of the invention, in the above device, the gaseous flow includes air contained in a Cathode Ray Tube connected to the pipe.

According to another aspect of the invention, in the above device, the pipe is annular in shape.

According to yet another aspect of the present invention, in the above device, the intermediate position is a position between the first biasing means and the retaining surface.

According to yet another aspect of the present invention, in the above device, the gaseous flow is generated by a vacuum pump extracting a gas from a vessel connected to the first portion of the pipe.

According to another aspect of the present invention, a method of controlling the flow in a vacuum extraction manifold port includes (1.) introducing a gaseous flow into a hollow pipe having valving means to confine the gaseous flow within the pipe. The valving means is operatively connected to first and second biasing means and is operated by either of the first and second biasing means, (2.) detecting the pressure of the gaseous flow; and permitting said gaseous flow to exit the pipe when the pressure is less than a first value, (3.) actuating the valving means via the first biasing means when the pressure exceeds a second value, and (4.) actuating the valving means via the second biasing means when the pressure exceeds a third value.

According to another aspect of the present invention, in the above method, the pipe is fabricated of steel.

According to another aspect of the present invention, in the above method, the valving means comprises a sliding poppet disposed within a cavity in said pipe operating in conjunction with a retaining surface.

According to another aspect of the present invention, in the above method, the first biasing means includes at least one spring.

According to another aspect of the present invention, in the above method, the second biasing means comprises a pressure sensitive linear actuator and actuator rod.

DETAILED DESCRIPTION

It is worthy to note that any reference herein to "one embodiment" or "an embodiment" means that a particular feature, structure, or characteristic described in connection with the embodiment is included in at least one embodiment of the invention. The appearances of the phrase "in one embodiment" in various places in the specification are not all necessarily referring to the same embodiment.

The embodiments of the invention include inter alia a method and apparatus for isolating one or more ports in a manifold assembly that draws a vacuum on a plurality of CRT's simultaneously during a manufacturing process, which method and apparatus includes an Excess Flow Valve implemented as part of an Exhaust cart assembly to isolate individually, defective CRT's under preparation when necessary, to preserve vacuum conditions in other, non defective CRT's under preparation.

Accordingly, one advantage of the present invention is that it provides a method and apparatus to eliminate collateral process defects in a plurality of CRT's under preparation that would normally result from a defect in only one of the CRT's under preparation.

Figure 1:
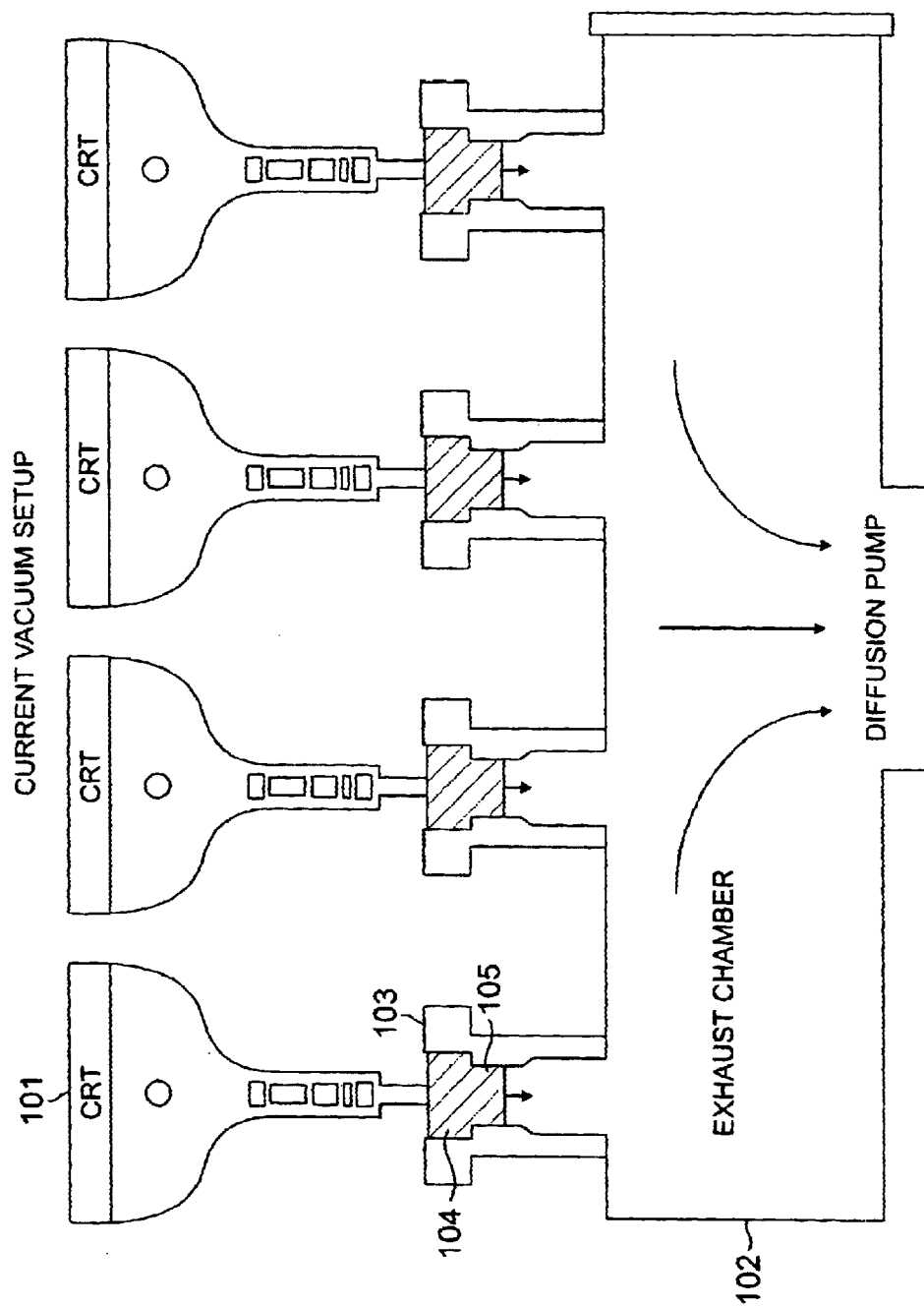
FIG. 1 is a schematic depicting a prior art manifolded exhaust chamber connected to four CRT's and a diffusion pump.

Typically in the production of small profile CRT's, a vacuum is drawn on every CRT while baking in an Exhaust Oven. This is accomplished by using vacuum carts, wherein each cart is set up to draw a vacuum on four CRT's simultaneously with a typical total of sixty carts utilized at a time. On each cart, the four CRT's are evacuated through a common manifold. Consequently, in the event that one of the CRT's breaks, the vacuum on the other CRT's in the installation is compromised rendering the other three CRT's defective. An example of a typical installation is shown in FIG. 1. As is shown a CRT 101 is connected to a manifolded exhaust chamber 102. Each CRT 101 is connected to the exhaust chamber 102 via manifold ports 103. Each port 103 has a compression ring 104 that seals the port 103 to the CRT 101. The compression ring 104 surrounds a removable metal stopper 105 through which the air in a CRT 101 is evacuated by a diffusion pump (not shown).

To overcome the problem of one defective CRT affecting all others in a cart the method and apparatus of the present invention were developed. To achieve isolation of a defective CRT in a manifold port an excess flow valve was attached to the metal stopper 104.

Figure 2:
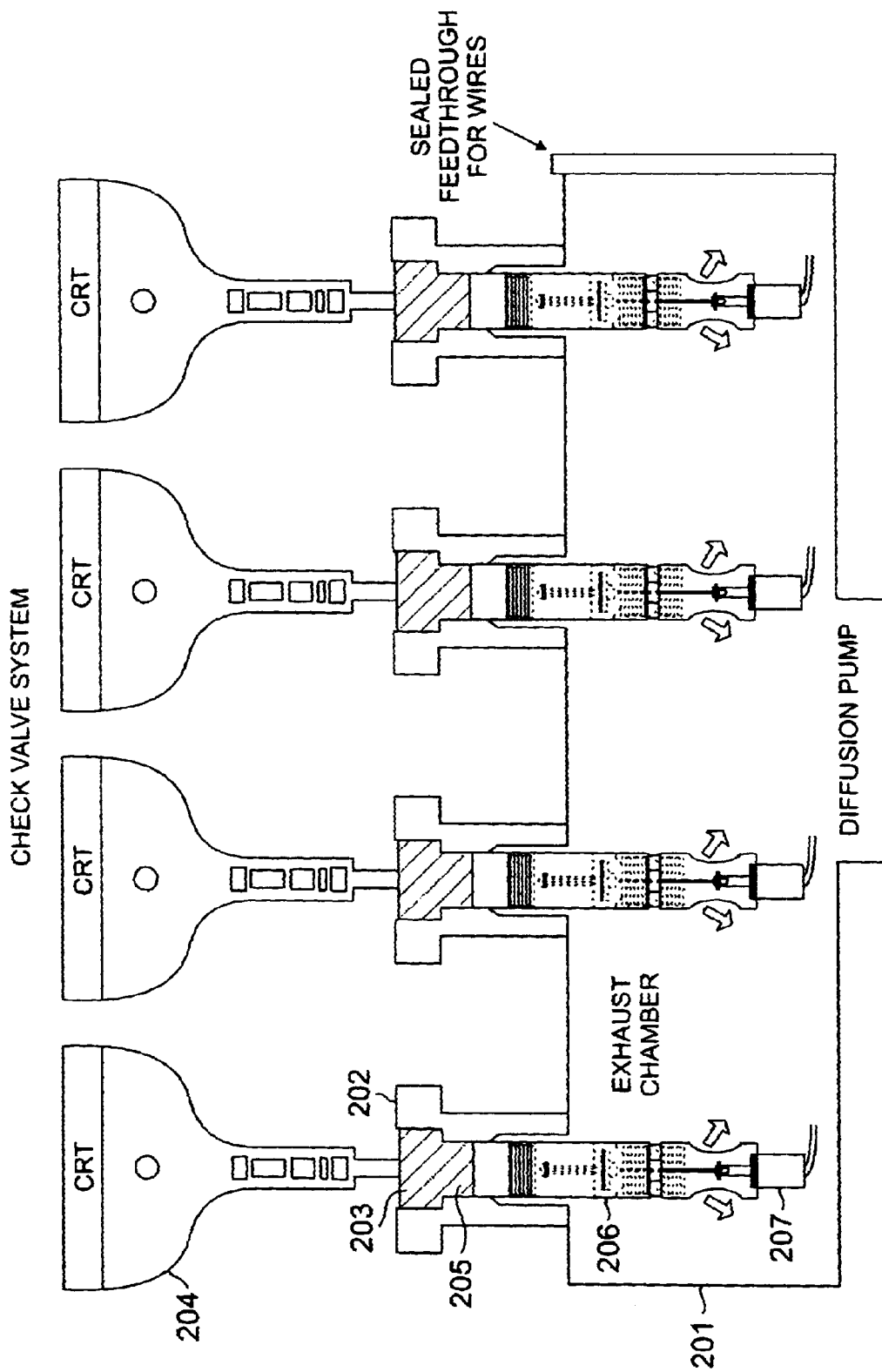
FIG. 2 is a schematic depicting a manifolded exhaust chamber connected to four CRT's and a diffusion pump in accordance with the present invention.

Referring now to FIG. 2, an arrangement incorporating the valve of the present invention includes a manifolded exhaust chamber 201 with manifold ports 202. Each port 202 comprises a compression ring 203 that seals the port 201 to a CRT 204. The compression ring surrounds a metal stopper 205 connected to a valve assembly 206. The valve assembly 206 includes linear actuator 207.

Figure 3:
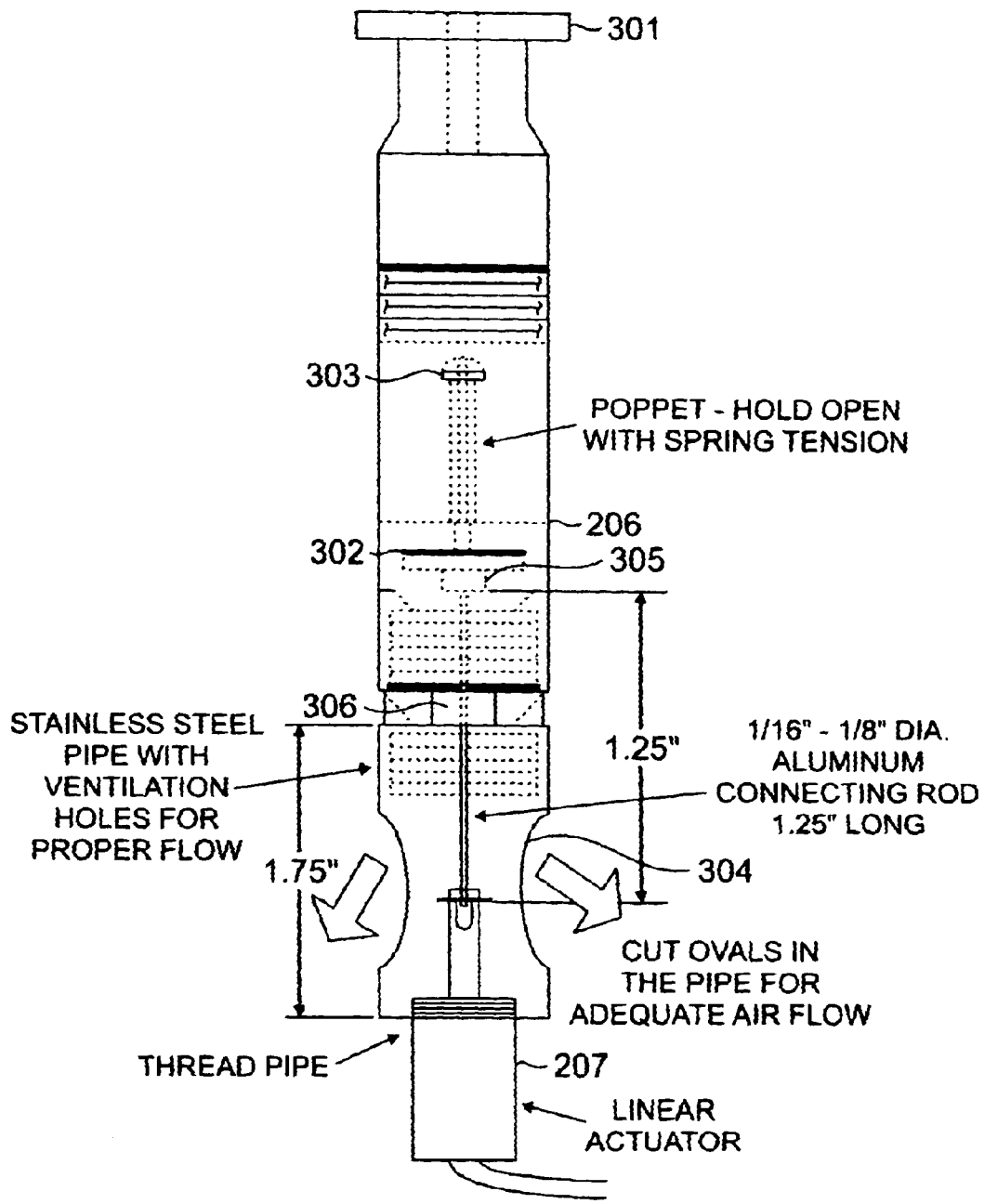
FIG. 3 is a drawing detailing an Excess Flow Valve in accordance with the present invention.

A more detailed depiction of valve assembly 206 and linear actuator 207 are shown in FIG. 3. As shown in FIG. 3, the valve assembly 206 has a front portion terminating in a flange 301 and a rear portion terminating in a linear actuator 207. The valve assembly 206 is comprised of a hollow pipe with exhaust ports 304 consisting of perforations in the pipe.

Within the cavity of the pipe, a poppet 302 is installed such that it can slide within the pipe and is attached toward the front portion of the valve assembly 206 by a spring 303. The poppet is further attached to the rear portion of the valve assembly 206 by an actuator rod 306. The actuator rod 306 is connected to, and is controlled by linear actuator 207. Also installed in the pipe cavity, is a retaining surface 305 that acts to restrict the movement of the poppet 302 towards the rear portion of the valve assembly 206 and form an airtight seal upon positive contact with poppet 302.

In operation, during vacuum extraction, a diffusion pump evacuates the exhaust chamber 201 depicted in FIG. 2, in turn evacuating CRT's 204 through manifold ports 202. Air evacuated from CRT's 204 passes through valve assemblies 206. With reference to FIG. 3, air being evacuated from a CRT enters the front portion of the valve assembly 206 through flange 301. The poppet 302 and spring 303 operate in concert to keep the poppet in a position that permits a gaseous flow entering the valve assembly 206 to flow past the poppet 302 and retaining surface 305 respectively and out of the valve assembly 206 through exit ports 304.

Operating under the principle of differential pressure, the poppet 302 is "held open" by spring 303 as long as the differential pressure on both sides of the poppet does not exceed the tension of the spring 303. If an evacuated CRT (see 204, FIG. 2) were to completely implode while under vacuum, the in rush of air would create enough "excess flow" to overcome the spring tension and drive the poppet 302 against retaining surface 305, thereby forming an airtight seal within the valve assembly 206. Once closed, the differential pressure on the surfaces of poppet 302 holds the poppet shut.

For less catastrophic failures, such as panel cracks in CRT's that slow leak to atmospheric pressure, sufficient excess flow to seal the poppet 302 against retaining surface 305 may not be experienced. In such an instance, linear actuator 207, connected to a pressure switch (not shown), is activated by the pressure switch when there is a slight predetermined increase in system pressure. Once activated, the linear actuator 207 moves poppet 302, via actuator rod 306, against retaining surface 305 to form the airtight seal.

After a specified period, five or six seconds for example, the actuator is released. In manifold ports where there has been a breach of the vacuum, the poppet 302 remains in positive contact with the retaining surface 305 due to differential pressure on the poppet and the seal is thus maintained. In ports where the vacuum has not been compromised the poppet opens back up since the spring tension is not overcome. With the port corresponding to the defective CRT isolated, vacuum levels in the remaining ports return to normal and the non-defective CRT's are not compromised.

All the features disclosed in this specification (including any accompanying claims, abstract and drawings), and/or all of the steps or any method or process so disclosed, may be combined in any combination, except combinations where at least some of the features and or steps are mutually exclusive. Each feature disclosed in this specification (including any accompanying claims, abstract and drawings) may be replaced by alternative features serving the same equivalent or similar purpose, unless expressly stated otherwise. Thus unless expressly stated otherwise, each feature disclosed is one example only of a generic series of equivalent or similar features.

Moreover, although various embodiments may be specifically illustrated and described herein, it will be appreciated that modifications and variations of the invention are covered by the above teachings and within the purview of the appended claims without departing from the spirit and intended scope of the invention.

What is claimed is:

1. A device for controlling the flow through a vacuum extraction manifold port comprising:
    a hollow pipe having a first portion and a second portion, said pipe having a cavity and comprising a retaining surface disposed within said cavity, said pipe further comprising exit ports;
    a poppet having a front section and a rear section slidably mounted within said cavity, said front section of said poppet being attached to said first portion of said pipe by a biasing means;
    an actuator rod disposed within said cavity, said actuator rod having a first end attached to said rear section of said poppet, said actuator rod further comprising a second end; and
    actuating means disposed at said second end of said pipe, said actuating means being connected to said second end of said actuator rod, wherein:
    (a) during introduction of a gaseous flow into said first portion of said pipe at less than a first pressure, said poppet remains in an intermediate position in said cavity thereby permitting said gaseous flow to travel through said first portion of said pipe, past said poppet and to exit said pipe through said exit ports; and
    (b) during introduction of said gaseous flow into said first portion of said pipe at greater than a second pressure, said pressure of said gaseous flow causes said poppet to slide against said retaining surface thereby establishing a seal and confining said gaseous flow within said cavity; and
    (c) during introduction of said gaseous flow at greater than a third pressure, said actuating means causes said actuator rod to drive said poppet against said retaining ring thereby establishing said seal and confining said gaseous flow within said cavity.

2. The device according to claim 1, wherein said pipe is fabricated of steel.

3. The device according to claim 1, wherein said exit ports comprise perforations in said pipe.

4. The device according to claim 1, wherein said biasing means comprises at least one spring.

5. The device according to claim 1, wherein said actuating means comprises a linear actuator.

6. The device according to claim 5, wherein said linear actuator comprises pressure sensing means.

7. The device according to claim 1, wherein said gaseous flow comprises air contained in a Cathode Ray Tube.

8. The device according to claim 1, wherein said pipe is annular in shape.

9. The device according to claim 1, wherein said intermediate position is a position between said biasing means and said retaining surface.

10. The device according to claim 1, wherein said gaseous flow is generated by a vacuum pump extracting a gas from a vessel attached to said first portion of said pipe.

11. A device for controlling gaseous flow in a vacuum extraction manifold port comprising:
    a hollow pipe having a first portion and a second portion, said pipe comprising a cavity, said cavity having a retaining surface disposed thereon;
    a poppet slidably mounted within said cavity, said poppet having a front section and a rear section, said poppet being connected to said first portion of said pipe by a first biasing means attached to said front section of said poppet, said poppet being further connected to said second portion of said pipe by a second biasing means attached to said rear section of said poppet; and
    exit vents to permit the escape of a gaseous flow through said pipe, wherein:
    (a) during introduction of said a gaseous flow into said first portion of said pipe at less than a first pressure, said poppet remains in an intermediate position in said cavity thereby permitting said gaseous flow to travel through said first portion of said pipe, past said poppet and to exit said pipe through said exit ports;

(b) during introduction of said gaseous flow into said first portion of said pipe at greater than a second pressure, said pressure of said gaseous flow causes said poppet to slide against said retaining surface thereby establishing a seal and confining said gaseous flow within said cavity; and (c) during introduction of said gaseous flow at greater than a third pressure, said second biasing means forces said poppet against said retaining ring thereby establishing said seal and confining said gaseous flow within said cavity.

12. The device according to claim 11, wherein said pipe is fabricated of steel.

13. The device according to claim 11, wherein said exit ports comprise perforations in said pipe.

14. The device according to claim 11, wherein said first biasing means comprises at least one spring.

15. The device according to claim 11, wherein said second biasing means comprises a linear actuator and actuating rod.

16. The device according to claim 5, wherein said linear actuator comprises pressure sensing means.

17. The device according to claim 1, wherein said gaseous flow comprises air contained in a Cathode Ray Tube.

18. The device according to claim 1, wherein said pipe is annular in shape.

19. The device according to claim 1, wherein said intermediate position is a position between said biasing means and said retaining surface.

20. The device according to claim 1, wherein said gaseous flow is generated by a vacuum pump extracting a gas from a vessel, said vessel being attached to said first portion of said pipe.

21. A method of controlling the flow in a vacuum extraction manifold comprising:

introducing a gaseous flow into a hollow pipe, said pipe having valving means to confine said gaseous flow within said pipe, said valving means being operatively connected to first and second biasing means, said valving means operated by either of said first and second biasing means;

detecting the pressure of said gaseous flow;

permitting said gaseous flow to exit said pipe when said pressure is less than a first value;

actuating said valving means via said first biasing means when said pressure exceeds a second value; and actuating said valving means via said second biasing means when said pressure exceeds a third value.

22. The method of claim 21, wherein said hollow pipe is fabricated of steel.

23. The method of claim 21, wherein said valving means comprises a sliding poppet disposed within a cavity in said pipe operating in conjunction with a retaining surface.

24. The method of claim 21, wherein said first biasing means comprises at least one spring.

25. The method of claim 21, wherein said second biasing means comprises a pressure sensitive linear actuator and actuator rod.

* * * * *